Figure 1:
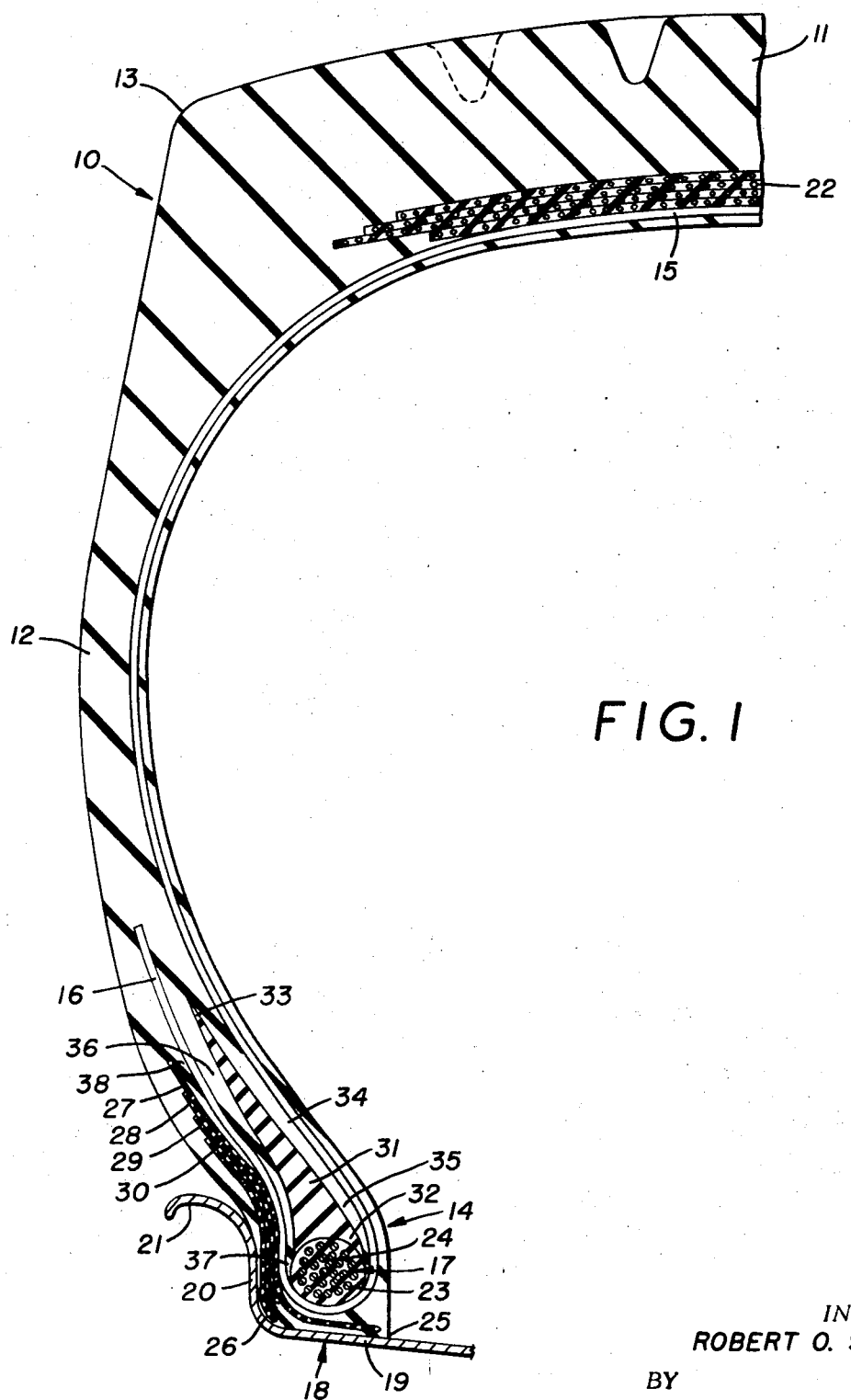

United States Patent
Simpson

[15] 3,682,223
[45] Aug. 8, 1972

[54] TIRE BEAD CONSTRUCTION

[72] Inventor: Robert O. Simpson, Cuyahoga Falls, Ohio 44223

[73] Assignee: The Goodyear Tire & Rubber Company, Akron, Ohio

[22] Filed: May 20, 1970

[21] Appl. No.: 39,814

[52] U.S. Cl............152/362 R, 152/356, 152/362 CS
[51] Int. Cl..............................................B60c 15/06
[58] Field of Search ....152/362 R, 362 CS, 354, 356, 152/362

[56] References Cited

UNITED STATES PATENTS

| | | | |
|---|---|---|---|
| 3,612,137 | 10/1971 | Guyot | 152/362 R |
| 3,612,138 | 10/1971 | Ravenhall | 152/362 R |
| 3,392,773 | 7/1968 | Warren et al. | 152/354 |
| 3,557,860 | 1/1971 | Maiocchi | 152/362 R |
| 3,052,275 | 9/1962 | Hylbert, Jr. | 152/362 R |
| 2,971,553 | 2/1961 | Woodall | 152/362 R |
| 3,013,599 | 12/1961 | Riggs | 152/362 R |
| 3,115,179 | 12/1963 | Shepherd | 152/362 R |
| 3,254,694 | 6/1966 | Sparks et al. | 152/362 R |
| 3,548,912 | 12/1970 | Rye et al. | 152/362 |

*Primary Examiner*—Drayton E. Hoffman
*Attorney*—F. W. Brunner and Michael L. Gill

[57] ABSTRACT

A radial wire pneumatic tire having a hard wedge shaped apex strip extending radially of and from each bead and a soft cushion strip disposed between the apex strip and the radial wire carcass.

The foregoing abstract is not to be taken as limiting the invention of this application, and in order to understand the full nature and extent of the technical disclosure of this application, reference must be made to the accompanying drawing and the following detailed description.

10 Claims, 1 Drawing Figure

PATENTED AUG 8 1972

3,682,223

INVENTOR.
ROBERT O. SIMPSON
BY
Michael L. Dill
ATTORNEY

TIRE BEAD CONSTRUCTION

This invention relates to pneumatic tires, and more particularly to a novel construction of the bead area of a pneumatic tire.

It is an object of this invention to provide a pneumatic tire having improved durability in the bead area, particularly with respect to radial ply tires.

Other objects will be in part apparent and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing:

FIG. 1 is a cross-sectional view of one-half of a tire constructed in accordance with this invention.

With reference to the drawing, there is illustrated one-half of a tire 10 constructed in accordance with this invention. While only one-half of the tire section is illustrated it is to be understood that the half not illustrated is the same as that illustrated but opposite in hand. The tire 10 comprises a ground engaging tread portion 11 which extends circumferentially of the tire 10 and a sidewall portion 12 which extends from each lateral edge of the tread 11 or shoulder 13 radially inwardly to a bead portion 14. A carcass 15 extends circumferentially about the tire 10 beneath the tread 11 and radially inwardly to the bead portion 14. The carcass 15 has its radially inner end or turn-up portion 16 turned up and about an inextensible bead core 17. The turn-up portion 16 of the carcass 15 is displaced axially from the remaining portion of the carcass 15 for the entire extent of the turn-up portion 16. That is to say the turn-up portion 16 never curves back axially toward the remaining portion or strength portion of the carcass 15 to the extent that it touches or comes into close proximity with the carcass 15.

When the tire 10 is in normal operation the bead portion 14 is mounted or seated on a rim 18. The rim 18 has a base 19 which engages and supports the radially inner side of the bead portion 14 and a flange 20 which extends radially outwardly from the base 19 and engages the axially outer side of the bead portion 14. The radially outer end of the flange 20 curves smoothly away from the bead portion 14 to form a rounded lip 21.

In the particular embodiment illustrated, the carcass 15 comprises a single ply of radial wire tire cords which form an angle of substantially 90 degrees with respect to the mid-circumferential centerplane. For purposes of this invention, however, a radial ply tire shall include tires whose cords form an angle of between 80 and 90 degrees with respect to the mid-circumferential centerplane. The mid-circumferential centerplane is a plane which is perpendicular to the rotational axis of the tire and is disposed midway between the shoulders 13 of the tread 11. Four belt plies 22 extend circumferentially about the tire 10 and are disposed radially outwardly of the carcass 15 beneath the tread 11.

The bead portion 14 contains the annular bead core 17 which comprises a plurality of circumferentially extending inextensible wires 23 embedded in a matrix 24 of hard rubber. The bead portion terminates at a toe 25 at its radially, axially innermost edge and at a heel 26 at its radially innermost, axially outermost edge. A first chipper ply 27 extends circumferentially of the tire, and about the bead core 17 from the toe 25, past the heel 26 to a point radially outwardly of the lip 21. Second, third and fourth chipper strips 28, 29, 30 are disposed successively axially outwardly of the first chipper ply 27 and extend radially outwardly from the area of the heel 26. Each chipper ply 28, 29, 30, respectively, terminates at a point radially inwardly with respect to the radially outer end of the next adjacent axially inner chipper ply. All four chipper plies 27, 28, 29, 30 are separated from the turn-up 16 at the portion thereof which is radially outwardly of the lip 21 by a wedge of rubber 38 which may be of the same hardness as the sidewall 12.

Also contained in the bead portion 14 is an apex strip 31 made of hard rubber which extends circumferentially of the tire and radially of and from the bead core 17 between the turn-up 16 and the carcass 15. In the particular embodiment illustrated the rubber in the apex strip has a hardness of 84 durometer. The apex strip 31 is substantially as wide at its base 32 adjacent the bead core 17 as is the bead core 17. The apex strip 31 tapers smoothly and gradually to a point 33 at its radially outer extremity. The apex strip 33 is separated from the carcass 15 on its axially inner side by a first cushion strip 34 which is co-extensive with the apex strip 31. The first cushion strip 34 may be of the same rubber compound as is the sidewall 12, but in any event has a hardness less than that of the apex strip 31. The first cushion strip 34 is substantially constant in thickness for its entire length with the exception of the portion or end 35 next adjacent the base 32 of the apex strip 31. The radially inner end 35 of the first cushion strip 34 tapers to a point as it reaches the area of the bead core 17.

A second soft rubber cushion strip 36 is disposed axially outwardly of the apex strip 31 and axially inwardly of the turn-up 16 of the carcass ply 15. Again, this second cushion strip 36 can be of the same material as the sidewall 12 but in any event must be of a hardness less than that of the apex strip 31. The second cushion strip 36 is co-extensive with the length of the apex strip 31 and also tapers to a point at its radially inner end 37 adjacent the bead core 17. In the particular embodiment illustrated, the first and second cushion strips 34, 36 both have a hardness of 61 durometer.

The hard apex strip 31 provides a bead portion 14 which is relatively stiff next adjacent to the bead core 17 but decreases in stiffness progressively radially outwardly of the bead core 17. This is particularly useful in radial ply tires in which the sidewall portion is quite flexible and will tend to bend severely around the lip 21 of the rim flange 20 and tend to cause premature failure of the tire if there is no reinforcing in that area. The hard apex 31 provides a gradual decrease in the flexibility of the tire 10 in the bead portion 14 and thus prevents premature failure. The flexing, therefore, in the bead area is distributed throughout a larger portion of the lower sidewall area or upper bead portion. Applicant, however, has found that the provision of a soft rubber insert or first cushion strip 34 between the hard apex strip 31 and the carcass 15 provides a dampening layer which substantially increases the durability or flex life of the bead portion 14. This first cushion strip 34 provides a transition between the hard apex strip 31 and the strength member or carcass 15 thus substantially increasing the durability of the bead portion 14. It is also desirable to provide the second cushion strip 36 to improve the durability of the bead portion 14 by providing a damping layer between the turn-up 16 and apex 31.

In order to obtain optimum results, particularly with respect to a radial wire tire, the hardness of the apex strip 31 should be between 75 and 95 durometer, and preferably between 80 and 88 durometer. The first and second cushion strips should have a hardness of between 50 and 75 durometer, and preferably between 55 and 65 durometer. The rubber matrix 24 of the bead core and the rubber surrounding the cords in the carcass ply should have a hardness similar to that of the apex strip 31. The apex strip 31 should extend substantially radially outwardly beyond the lip 21 of the flange 20 of the wheel on which the tire is to be mounted a distance equal to at least the radial extent of the flange 20.

While this invention has been described in conjunction with a single radial wire tire having four belt plies, it will be apparent to those skilled in the art that such a combination of hard apex strip and soft cushion strip would find value in radial ply tires having one or more radial plies, more or less than four belt plies and being constructed of material other than wire. Further, it will be apparent that such a bead area construction will also find value in bias ply tires.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a pair only of annular bead cores; a carcass having its end portions turned up around said bead cores and axially displaced from the remaining portion of the carcass; an annular apex strip disposed between said carcass and each of said end portions and extending radially of and from each of said bead cores, said apex strip being substantially as wide as said one of said bead cores at said one of said bead cores, having a hardness of between 75 and 95 durometer and smoothly tapering to a point at its radially outer end; and, a first cushion strip having a hardness of between 50 and 75 durometer disposed axially inwardly with respect to said apex strip and between said apex strip and said carcass and extending for substantially the entire radial extent of said apex strip to separate said apex strip from said carcass.

2. A tire as claimed in claim 1, further including a second cushion strip having a hardness less than the hardness of said apex strip disposed between each said apex strip and said end portion turned up around said bead core.

3. A tire as claimed in claim 1, wherein said carcass is comprised of a plurality of parallel tire cords extending substantially in the radial direction.

4. A tire as claimed in claim 1, wherein said carcass comprises a single ply of radial wire tire cords.

5. A tire as claimed in claim 2, wherein and second cushion strips have a hardness of between 50 and 75 durometer.

6. A tire as claimed in claim 4, further including a second cushion strip disposed between each said apex strip and said end turned up around said bead.

7. A tire as claimed in claim 6, wherein second cushion strips have a hardness of between 50 and 75 durometer.

8. A tire as claimed in claim 7, which when mounted on a wheel said apex strip extends radially outwardly beyond the radially outer extent of the flange of said wheel a distance which is equal to at least the radial extent of said flange.

9. A tire as claimed in claim 8, wherein said apex strip has a hardness of between 80 and 88 durometer and said first and second cushion strips have a hardness of between 55 and 65 durometer.

10. A tire as claimed in claim 5, wherein said apex strip has a hardness of between 80 and 88 durometer and said first and second cushion strips have a hardness of between 55 and 65 durometer.

* * * * *

PO-1050
(5/69)

UNITED STATES PATENT OFFICE
CERTIFICATE OF CORRECTION

Patent No. 3,682,223                    Dated August 8, 1972

Inventor(s) Robert O Simpson

It is certified that error appears in the above-identified patent and that said Letters Patent are hereby corrected as shown below:

In Column 4, line 21 of the patent, change "and" to "said".

In Applicant's amendment dated November 22, 1971, Applicant amended Claim 5 to delete "said apex strip has a hardness of between 75 and 95 durometer and said first and". The term "said" appearing before "first" and "second" modified both the term "first" and the term "second" and, therefore, should not have been deleted in that amendment since the term "second" was retained in the claim.

The insertion of the term "and" appearing prior to "second" in Line 21 of Column 4 appears to be a Patent Office error.

Signed and sealed this 1st day of May 1973.

(SEAL)
Attest:

EDWARD M. FLETCHER, JR.          ROBERT GOTTSCHALK
Attesting Officer                Commissioner of Patents